United States Patent [19]

Howell et al.

[11] 4,375,519

[45] Mar. 1, 1983

[54] ION EXCHANGE RESINS

[75] Inventors: Thomas J. Howell, Langhorne, Pa.; William G. Paterson, Wickham; Ian Pattison, Washington, both of England

[73] Assignee: Rohm and Haas Company, Philadelphia, Pa.

[21] Appl. No.: 189,555

[22] Filed: Sep. 22, 1980

Related U.S. Application Data

[60] Division of Ser. No. 904,178, May 8, 1978, Pat. No. 4,246,386, which is a continuation-in-part of Ser. No. 797,716, May 17, 1977, abandoned.

[51] Int. Cl.$^3$ .......................... C08F 8/00; C08F 8/30; C08F 8/32; C08F 8/36
[52] U.S. Cl. ...................................... 521/31; 521/32; 521/33; 526/207; 526/281; 526/283; 526/285
[58] Field of Search ............................. 521/31, 32, 33

[56] References Cited

U.S. PATENT DOCUMENTS

| | | | |
|---|---|---|---|
| 2,241,770 | 5/1941 | Dreisbach et al. | 260/666.5 |
| 2,290,547 | 7/1942 | Dreisbach et al. | 260/45.7 R |
| 3,674,728 | 7/1972 | Carbonnel et al. | 521/31 |
| 3,976,629 | 8/1976 | Hayward et al. | 521/29 |

FOREIGN PATENT DOCUMENTS 1261427  1/1972  United Kingdom.

*Primary Examiner*—Stanford M. Levin
*Attorney, Agent, or Firm*—Alvin M. Esterlitz

[57] ABSTRACT

Hard, infusible, discrete beads of crosslinked copolymer are prepared by free-radical catalyzed polymerization of a monomer mixture in aqueous dispersion wherein a minor amount of a modifier, specifically an organic compound containing acetylenic or allylic unsaturation having the ability to moderate the rate of polymerization, is incorporated in the monomer mixture. Ion exchange resins having improved mechanical strength are obtained by attaching functional groups to the copolymer.

6 Claims, No Drawings

ION EXCHANGE RESINS

This is a division of application Ser. No. 904,178, filed May 8, 1978, now U.S. Pat. No. 4,246,386, which in turn is a continuation-in-part of application Ser. No. 797,716, filed May 17, 1977, now abandoned.

This invention concerns an improved process for the preparation of crosslinked vinyl copolymers as discrete copolymer beads in aqueous dispersions using certain reaction modifiers in the polymerization in a novel way. The invention also concerns the ion exchange resins having improved physical characteristics obtained by appending conventional ion exchange functional groups to said copolymers.

The techniques of preparing crosslinked vinyl copolymers in bead form (as precursors for conversion into ion exchange resins) by free-radical catalyzed polymerization of the monomer mixture in aqueous dispersion are well known. The term "cross-linked vinyl copolymer" and the like is used for the sake of brevity herein to signify copolymers of a major proportion, e.g., from 50 upwards to about 99.5 mole percent, preferably 80 to 99%, of monovinyl aromatic monomers, e.g., styrene, vinyl toluene, vinyl naphthalene, ethyl vinyl benzene, vinyl chlorobenzene, chloromethyl styrene, and the like, with a minor proportion, e.g., of from about 0.5 up to 50 mole percent, preferably 1 to 20%, of polyvinyl compounds having at least two active vinyl groups polymerizable with the aforesaid monovinyl monomer to form a crosslinked, insoluble, infusible copolymer, for example, divinyl benzene, trimethylolpropane trimethacrylate, ethylene glycol dimethacrylate, divinyl toluene, trivinyl benzene, divinyl chlorobenzene, diallyl phthalate, divinylpyridine, divinylnaphthalene, ethylene glycol diacrylate, neopentyl glycol dimethacrylate, diethylene glycol divinylether, bisphenol-A-dimethacrylate, pentaerythritol tetra- and trimethacrylates, divinylxylene, divinylethylbenzene, divinyl sulfone, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylene-diacrylamide, N,N'-methylene dimethacrylamide, N,N'-ethylene-diacrylamide, trivinyl naphthalene, polyvinyl anthracenes and the polyallyl and polyvinyl ethers of glycol, glycerol, pentaerythritol, resorcinol and the monothio and dithio derivatives of glycols. The copolymer may also have incorporated therein polymerized units of up to about 5 mole percent of other vinyl monomers which do not affect the basic nature of the resin matrix, for example, acrylonitrile, butadiene, methacrylic acid and others known in the art.

The conventional conditions of polymerization used heretofore lead to crosslinked vinyl copolymers, which, when converted to ion exchange resins by attachment of functional groups thereto, have certain operational deficiencies resulting from physical weaknesses.

The practice of the present invention yields ion exchange resins in which the polymer beads have greater mechanical strength and increased resistance to swelling pressures which are produced within a bead during acid/base cycling (i.e., osmotic shock). The greater mechanical strength of the beads manifests itself in improved resistance to physical breakdown from external forces such as weight of the resin column bed, high fluid flows and backwashing. Thus, the physically stronger ion exchange resins embodied herein are especially useful in treating fluid streams of high flow rates, for example, condensate polishing applications in which resins of lesser quality are prone to mechanical breakdown and short life spans.

In the past, it has generally been the practice to exclude reaction modifiers in the preparation of crosslinked vinyl polymers used as the base matrix copolymer for ion exchange resins because they have been regarded as detrimental to the properties of these copolymers. U.S. Pat. No. 2,241,770 teaches that styrene is stabilized for storage by treatment with a representative modifier, phenylacetylene, with the admonition to remove the phenylacetylene from the monomer prior to its polymerization. While polymerization of styrene in conjunction with phenylacetylene at temperatures between 100° C. and 225° C. to produce a linear, uncrosslinked polymer is described in U.S. Pat. No. 2,290,547, there is no suggestion in the art that crosslinked copolymers useful for conversion into greatly improved ion exchange resins could be derived from polymerization systems incorporating modifiers such as phenylacetylene. British Pat. No. 1,261,427 teaches that the gel effect in the polymerization of acrylonitrile, acrylates and methacrylates or copolymerization thereof with styrene or vinyl acetate can be reduced or eliminated by the use of cyclic compounds such as 1,4-cyclohexadiene and terpinolene. Again, there is no suggestion in this art that such modifiers are useful in preparing improved crosslinked copolymers. U.S. Pat. No. 3,976,629 discloses the use of various aliphatic compounds containing at least two polymerizable bonds, such as isoprene and cyclopentadiene, as crosslinkers in aliphatic monomer mixtures. Combinations of aromatic and polyunsaturated aliphatic crosslinkers, including compounds used herein as rate modifiers, have also been generally known in the prior ion exchange art (see, e.g., U.S. Pat. No. 3,674,728). These polyunsaturated aliphatic materials have been employed previously at much higher levels than herein for different purposes and under different polymerization conditions.

In accordance with this invention, vinyl monomer, crosslinking monomer, and other optional monomer or monomers, are polymerized in aqueous dispersion containing a free-radical initiator and a minor amount of modifier incorporated in the monomer mixture, said modifier being an organic compound containing acetylenic or allylic unsaturation, said compound being capable of moderating rate of polymerization. Representative of such modifiers are phenylacetylene, terpinolene, bicycloheptadiene, dimethyloctatriene, dimer of cyclopentadiene, dimer of methylcyclopentadiene, terpenes, 2-methyl styrene, α-methyl styrene dimer, limonene, cyclohexadiene, methyl cyclohexadiene, camphene, geraniol, farnesol, 2-norbornene, cyclododecatriene, cyclooctadiene, cyclododecene, allyl benzene, 4-vinyl-1-cyclohexene, and the like.

Generally, from about 0.01 to about 10 millimoles of modifier per mole of monomers are required to obtain the benefits of the invention, with a preferred amount being from 0.1 to 10 millimoles/mole of monomers even more preferably about 0.2 to about 5 millimoles per mole of monomers, in the monomer mixture referred to hereinabove.

The polymerization is normally carried out at temperatures ranging from about 30° to about 95° C., preferably 45° to 85° C., and more preferably from 50° to 75° C. It is desirable to employ lower temperatures of reaction in the initial stages of the polymerization, that is until at least about 50% of the monomers in the dispersion are reacted, preferably 75% or more. The free radical initiator used in the process of the invention is one capable of catalyzing polymerization at the aforesaid temperatures, which are in general somewhat lower, e.g., from 15° to 35° C. lower, than those normally used heretofore in suspension polymerization for similar products. Representative initiators are di(4-t-butycyclohexyl)peroxydicarbonate, dicyclohexyl peroxydicarbonate, di-(sec-butyl)peroxydicarbonate, di-(2-ethylhexyl)peroxy dicarbonate, dibenzyl peroxydicarbonate, diisopropyl peroxydicarbonate, azobis (isobutyronitrile), azobis (2,4-dimethylvaleronitrile), t-butyl peroxypivalate, lauroyl peroxide, benzoyl peroxide, t-butyl peroctoate, t-butyl peroxyisobutyrate, and the like. The amount of initiator employed is normally from about 0.1 to about 2 percent, based on monomer weight, preferably 0.3 to 1%. It also may be advantageous when using catalysts which are active at relatively low temperatures, such as 30°-60° C., to employ a second so-called "chaser catalyst" which is active at higher temperature, e.g., 75°-100° C., in order to achieve higher yields of crosslinked vinyl polymer, for example, from about 0.05 to 0.1% based on monomer weight of such initiators as benzoyl peroxide, t-butyl peroctoate, t-butyl peroxyisobutyrate, and the like.

The aqueous media in which the polymerization is conducted in dispersion form will contain minor amounts of the conventional suspension additives, that is, dispersants such as xanthan gum (biosynthetic polysaccharide), poly(diallyl dimethyl ammonium chloride), polyacrylic acid (and salts), polyacrylamide, magnesium silicate, and hydrolyzed poly(styrene-maleic anhydride); protective colloids such as carboxymethyl cellulose, hydroxyalkyl cellulose, methyl cellulose, polyvinyl alcohol, gelatin, and alginates; buffering aids such as phosphate and borate salts; and pH control chemicals such as sodium hydroxide and sodium carbonate.

The crosslinked, high-molecular weight copolymers are recovered from the reactor as hard, discrete beads of particle size within the range of about 0.02 to 2 mm, average particle size being on the order of 0.2 to 1 mm. These copolymers are converted to ion exchange resins by attachment of functional groups thereto by conventional means, such functional groups including sulfonamide, trialkylamino, tetraalkyl ammonium, carboxyl, carboxylate, sulfonic, sulfonate, hydroxylalkyl ammonium, iminodiacetate, amine oxide, phosphonate, and others known in the art. Functionalizing reactions which may be performed on vinyl aromatic copolymers to produce ion exchange resins are exemplified by sulfonation with concentrated sulfuric acid, chlorosulfonation with chlorosulfonic acid followed by amination, reaction with sulfuryl chloride or thionyl chloride followed by amination, and chloromethylation followed by amination. Typical functionalizing reactions on (vinyl) acrylic copolymers include hydrolysis to acrylic acid resins, amidolysis, transesterification, and the like. Ion exchange resins may be further delineated by the types: strong acid cation, i.e., containing the groupings sulfonic ($-SO_3H$) or sulfonate ($-SO_3M$, where M is usually an alkali metal ion); weak acid cation, i.e., containing the groupings carboxyl ($-CO_2H$) or carboxylate ($-CO_2M$, where M is usually an alkali metal ion); strong base anion, i.e., containing the tetraalkyl ammonium groupings: $-NR_3X$, where R is an alkyl or hydroxy alkyl group and X is usually chloride or hydroxide; and weak base anion, i.e., containing a trialkylamino group, $-NR_2$, where R is an alkyl or hydroxyalkyl group.

The improvements in the properties of the resins produced according to this invention are not evident until the crosslinked copolymers are converted to ion exchange resins by the attachment of the aforesaid functional groups. The enhanced physical strength of these latter resins is apparent from their resistance to crushing which is conveniently measured on the Chatillon instrument, as well as by visual inspection before and after use in ion exchange applications. For example, strong acid, styrene-type resins frequently exhibit Chatillon values in the range of about 1000 to about 5000 gm, force per bead, in contrast to resins derived from copolymers prepared by prior art polymerization methods which have Chatillon values in the range of about 50 to 500 gm/bead. Similarly, strong base styrene-type resins of the invention frequently exhibit Chatillon values of about 500 to 1500 in contrast to resins derived from copolymers prepared by prior art methods which have Chatillon values of 25 to 400.

The process of the invention is clarified by the following illustrative examples which are not to be construed as limitative thereof.

Polymerization Procedures

A. The polymerization reactor is a two-liter, three neck, round bottom flask equipped with a two-blade paddle stirrer, thermometer, condenser, heating mantle with temperature controller, and provision for sweeping in a blanket of inert gas. Into this reactor is charged a monomer mixture consisting of 491.7 g. styrene, 85.5 g. divinylbenzene, 8.8 g. methyl acrylate, 0.293 g. methylcyclopentadiene dimer, 2.64 g. di-(4-t-butylcyclohexyl)peroxydicarbonate, and 0.293 g. t-butyl peroctoate. The head space is swept with 8% $O_2$ in nitrogen for 30 minutes at 50 cc./min. Then an aqueous phase is added consisting of 510 g. water, 20.1 g. poly(diallyl dimethyl ammonium chloride) dispersant ("Padmac A"), 1.6 g. gelatin protective colloid ("Pharmagel"), 0.88 g. boric acid, 0.59 g. sodium nitrite, and sufficient 50% sodium hydroxide solution to maintain pH between 10 and 10.5. The stirrer is started and the gas sweep is changed to all nitrogen. The reaction mixture is heated from room temperature to 55°±2° C. over 45 minutes and held at this temperature for 7 hours. The polymerization is finished off by holding at 75° C. for one hour and 95° C. for another hour. The copolymer beads are washed and excess water is removed by vacuum filtration on a Buchner funnel.

B. In like manner, except for the omission of the oxygen-nitrogen sweep, 500.5 g. styrene, 85.5 g. divinylbenzene, 0.586 g. methylcyclopentadiene dimer, and 2.2 g. benzoyl peroxide are mixed with an aqueous phase composed of 510 g. water, 20.1 g. "Padmac A" dispersant, 1.6 g. "Pharmagel" colloid, 0.88 g. boric acid, 0.59 g. sodium nitrite, and sufficient 50% sodium hydroxide solution to maintain pH between 10 and 10.5. The reaction mixture is heated from room temperature to 75° C. over a 45 min. period and held at 73°-77° C. for four hours. The polymerization is finished off at a temperature of 95° C. maintained for one hour. The copolymer beads are washed and prepared for functionalization.

Sulfonation of Copolymer

A portion of wet polymer beads as prepared above (110 gms.) is added to 600 grams of 95% $H_2SO_4$ in a one liter flask equipped with stirrer, condenser, dropping funnel, thermometer, caustic scrubber and heating means. Thirty-nine grams of ethylene dichloride (bead swelling agent) are added, and the suspension is heated from 30° C. to 120° C. over a 3 hour period. This is followed by a hydration procedure in which water is added to quench the product. The polymer beads are transferred to a backwash tower and backwashed to remove residual acid.

Ion exchange resin products prepared by functionalizing (by sulfonation as above) the copolymer from polymerization method B are characterized in the table below. Other exemplary modifiers, substituted for methylcyclopentadiene dimer (MCPD), may be utilized to yield improvements in bead appearance. Resins prepared according to the invention are designated as C, D, and E.

| Resin | Modifier (mmole/mole monomers) | Chatillon (g/bead) | Appearance (Perfect/Cracked/Fragmented) |
|---|---|---|---|
| A | None | 400 | 53/45/2 |
| B | None | 440 | 55/41/4 |
| C | Phenylacetylene (1.0) | 670 | 89/4/7 |
| D | Terpinolene (0.7) | 780 | 82/15/3 |
| E | MCPD (0.6) | 520 | 89/10/1 |

An even greater improvement in bead quality is obtained with the copolymer from polymerization method A. The sulfonated resin derived therefrom is characterized by the following properties.

Whole beads: 100%
Cracked beads: 3%
Fractured beads: 0%
Perfect beads: 97%
Friability: Chatillon value, g/bead: 1880
Solids, H+ form: 47.0%
Salt Splitting Cation capacity, meq./g dry: 5.06

Additional crosslinked styrene copolymers are prepared as above with variations in the concentration of the modifier, MCPD, then sulfonated as described above to yield ion exchange resins, the properties of which are compared to commercial sulfonated resins made from copolymers prepared without modifier addition. In the following table, the resins of this invention are designated as F, G, H, and J.

| Resin | Modifier Conc., mmole per Mole Monomers | Chatillon, g/bead | Microcycling Stability* Before** | After |
|---|---|---|---|---|
| F | None | 1170 | 82/16/2 | — |
| G | 0.15 | 1870 | 98/2/0 | 96/4/0 |
| H | 0.3 | 1700 | 98/2/0 | — |
| J | 0.3 | 1880 | 97/3/0 | 93/7/0 |
| Commercial Resin A | — | 300 | 72/26/2 | 49/46/5 |
| Commercial Resin B | — | 510 | 98.5/1.5/0 | 55/42/3 |

Notes:
*100 cycles with 1N HCl and 0.5N NaOH solutions.
**Perfect/Cracked/Fragmented.

Other crosslinked styrene copolymers are prepared in accordance with this invention using a representative reaction modifier, then chloromethylated and aminated in a conventional manner to form strong base, anion exchange resins, the properties of which are compared to commercial resins having the same functional groups and made from copolymers prepared without modifier addition. In the following table, the resins of this invention are designated as K and L.

| Resin | MCPD Modifier Conc., (mmole/mole monomers) | Chatillon (g/bead) | Anion Exchange Capacity, meq./gm. | % Solids | Microcycling Stability* Before** | After |
|---|---|---|---|---|---|---|
| K | 0.3 | 372 | 4.22 | 45.5 | 99/1/0 | 95/5/0 |
| L | 0.6 | 278 | 4.30 | 45.2 | 98/2/0 | 90/9/1 |
| Commercial Resin X | — | 140 | 4.20 | 46.0 | 94/6/0 | 72/28/0 |
| Commercial Resin Y | — | 400 | 4.40 | 42.5 | 97/3/0 | 90/9/0 |

*100 cycles with hot (30° C.) 1N NaOH and 0.25 N HCl - 0.25 N $H_2SO_4$ solutions.
**Perfect/Cracked/Fragmented In like manner, ion exchange resins derived from crosslinked styrene copolymers prepared employing other polymerization modifiers mentioned earlier herein exhibit comparable properties of high mechanical strength and resistance to osmotic shock.

What is claimed is:

1. An ion exchange resin having improved physical strength obtained by attaching a functional group selected from the class consisting of sulfonamide, trialkylamino, tetraalkyl ammonium, carboxyl, carboxylate, sulfonic, sulfonate, hydroxyalkyl ammonium, iminodiacetate, amine oxide, and phosphonate to the crosslinked copolymer prepared by the process of preparing hard, crosslinked discrete copolymer beads by the free radical polymerization in an aqueous dispersion of a monomer mixture composed of a major proportion of (a) monovinyl monomer and a minor proportion of (b) crosslinking monomer having at least two active vinyl groups, wherein the improvement comprises conducting the polymerization reaction at a temperature within the range of about 30° to 95° C. with a modifier in admixture with the aforesaid monomer mixture, the modifier being present in a concentration of from about 0.01 to about 10 millimoles per mole of monomers, in the monomer mixture (a) and (b), said modifier being an organic compound containing acetylenic or allylic unsaturation, said organic compound being capable of moderating rate of polymerization, and wherein, when the modifier contains allylic unsaturation, is selected from the group consisting of terpinolene, bicycloheptadiene, dimethyloctatriene, dimer of methyl cyclopentadiene, terpenes, 2-methyl styrene, α-methyl styrene dimer, limonene, cyclohexadiene, methyl cyclohexadiene, camphene, geraniol, farnesol, 2-norbornene, cyclododecatriene, cyclpooctadiene, cyclododecene, allyl benzene and 4-vinyl-1-cyclohexene 2. An ion exchange resin according to claim 1 in which the major proportion of each of the crosslinked, discrete copolymer beads is made up of polymerized monovinyl aromatic monomer units.

3. An ion exchange resin according to claim 2 in which the copolymer consists essentially of polymerized monomeric units of styrene and divinyl benzene.

4. An ion exchange resin according to claim 1 in which the modifier is present in concentration of from about 0.2 to about 5 millimoles per mole of monomers in the monomer mixture (a) and (b).

5. An ion exchange resin according to claim 1 wherein the modifier is terpinolene.

6. An ion exchange resin according to claim 1 wherein the modifier is the dimer of methylcyclopentadiene.

* * * * *

UNITED STATES PATENT AND TRADEMARK OFFICE
CERTIFICATE OF CORRECTION

PATENT NO. : 4,375,519
DATED : March 1, 1983
INVENTOR(S) : THOMAS J. HOWELL et al It is certified that error appears in the above-identified patent and that said Letters Patent is hereby corrected as shown below:

Column 1, line 35-36,
"divinylnaphtalene" should be --divinylnaphthalene--

Column 6, 2nd chart
"*100 cycles with hot (30°C)" should be
--*100 cycles with hot (50°C)--

Column 6, line 54, "comprosed" should be -- comprised --.

Signed and Sealed this

Twenty-seventh Day of March 1984

[SEAL]

Attest:

GERALD J. MOSSINGHOFF

Attesting Officer     Commissioner of Patents and Trademarks